(12) United States Patent
Hsiao et al.

(10) Patent No.: US 11,941,178 B2
(45) Date of Patent: Mar. 26, 2024

(54) ELECTRONIC DEVICE AND CONTROL METHOD THEREOF

(71) Applicant: ASUSTEK COMPUTER INC., Taipei (TW)

(72) Inventors: Wen Fang Hsiao, Taipei (TW); I-Hsi Wu, Taipei (TW); Shin-Yi Huang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/514,494

(22) Filed: Oct. 29, 2021

(65) Prior Publication Data

US 2022/0137714 A1 May 5, 2022

(30) Foreign Application Priority Data

Nov. 2, 2020 (TW) ................................ 109138018

(51) Int. Cl.
*G06F 3/01* (2006.01)
*G06F 3/0488* (2022.01)

(52) U.S. Cl.
CPC ............ *G06F 3/017* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 9,354,709 B1* | 5/2016 | Heller | ................... | G06F 1/1694 |
| 10,983,606 B2 | 4/2021 | Chen | | |
| 2014/0351699 A1* | 11/2014 | Wang | ................... | G06F 1/1694 |
| | | | | 715/702 |
| 2016/0041620 A1* | 2/2016 | Motoyama | .............. | G06F 3/012 |
| | | | | 345/156 |
| 2018/0188894 A1* | 7/2018 | Feinstein | ................ | G06F 3/041 |

FOREIGN PATENT DOCUMENTS

| | | |
|---|---|---|
| CN | 103729119 A | 4/2014 |
| CN | 104182404 A | 12/2014 |
| CN | 102566796 B | 3/2015 |
| CN | 103324273 B | 11/2017 |
| CN | 108563387 A | 9/2018 |
| CN | 108920228 A | 11/2018 |
| TW | 202004433 A | 1/2020 |
| WO | WO2017031647 A1 | 3/2017 |

OTHER PUBLICATIONS

Chinese Office Action dated Jul. 7, 2023 in Application No. 202011204761.0, 4 Pages.

* cited by examiner

*Primary Examiner* — Carl Adams

(74) *Attorney, Agent, or Firm* — Muncy, Geissler, Olds & Lowe, P.C.

(57) ABSTRACT

An electronic device is provided. The electronic device includes a touch module, a motion sensor, a memory, and a control unit. The touch module is configured to generate a touch signal. The motion sensor is configured to detect motion of the electronic device to generate motion data. The memory stores a preset motion condition. The control unit is electrically connected to the touch module, the motion sensor, and the memory, and configured to: receive the motion data; and determine whether the motion data meets the preset motion condition or not, and generate a virtual touch signal when the motion data meets the preset motion condition. A control method applied to the electronic device is further provided.

8 Claims, 6 Drawing Sheets

ELECTRONIC DEVICE AND CONTROL METHOD THEREOF

CROSS-REFERENCE TO RELATED APPLICATION

This application claims the priority benefit of Taiwan Application Serial No. 109138018, filed on Nov. 2, 2020. The entirety of the above-mentioned patent application is hereby incorporated by reference herein and made a part of specification.

BACKGROUND OF THE INVENTION

Field of the Invention

The disclosure relates to an electronic device and its control method.

Description of the Related Art

Small mobile devices are easily for carry. However, it is difficult for users to perform touch operations on the mobile devices with small operation area. Especially when users perform continuously touch operations in a game with a limited area on the mobile device, which affects the control efficiency.

BRIEF SUMMARY OF THE INVENTION

The disclosure provides an electronic device. The electronic device includes a touch module, a motion sensor, a memory, and a control unit. The touch module is configured to generate a touch signal. The motion sensor is configured to detect motion of the electronic device to generate motion data. The memory stores a preset motion condition. The control unit is electrically connected to the touch module, the motion sensor, and the memory, and configured to: receive the motion data; and determine whether the motion data meets the preset motion condition or not, and generate a virtual touch signal when the motion data meets the preset motion condition.

The disclosure further provides a control method, applied to an electronic device. The control method includes: setting a preset motion condition; detecting motion of the electronic device to generate motion data; and determining whether the motion data meets the preset motion condition or not, and generating a virtual touch signal when the motion data meets the preset motion condition.

According to the electronic device and the control method disclose herein, when users perform input operations by the touch module, the motion sensor simultaneously generate the virtual touch signal that simulate touch inputting, thus to replace a touch operation and improves the control efficiency.

DETAILED DESCRIPTION OF THE EMBODIMENTS

Specific implementations of the disclosure are described in further detail below with reference to schematic diagrams. The advantages and features of the disclosure are described more clearly according to the following description and claims. It is to be noted that all of the accompanying drawings use very simplified forms and imprecise proportions, which are only used for assisting in conveniently and clearly explaining the objective of the embodiments of the disclosure.

Figure 1:
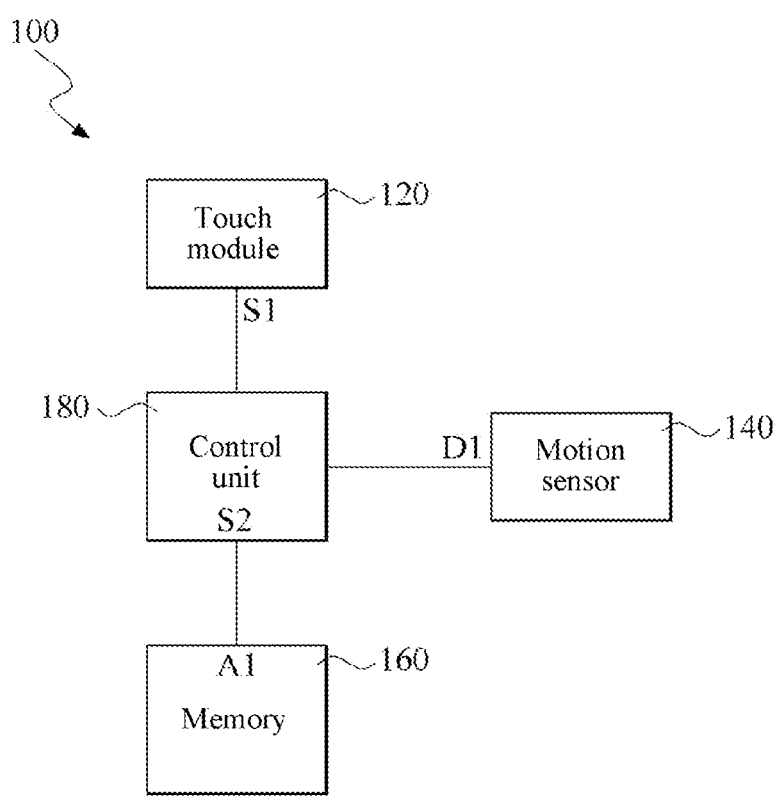
FIG. 1 is a schematic block diagram of an electronic device according to an embodiment of the disclosure.

FIG. 1 is a schematic block diagram of an electronic device according to an embodiment of the disclosure. As shown in the figure, an electronic device 100 provided in this embodiment includes a touch module 120, a motion sensor 140, a memory 160, and a control unit 180. In an embodiment, the electronic device 100 is a handheld device, such as a mobile phone, a tablet computer, or a handheld game console.

The touch module 120 is configured to generate a touch signal S1. In an embodiment, the touch module 120 includes a touch panel or a touch pad.

The motion sensor 140 is configured to detect motion of the electronic device 100 to generate motion data D1. In an embodiment, the motion sensor 140 is an accelerometer or a gyroscope.

The memory 160 stores a preset motion condition A1. The preset motion condition A1 corresponds to a preset motion mode, and is used for determining whether motion of a user conforms to the preset motion mode or not. In an embodiment, the memory 160 is a random access memory, a solid state disk, or another storage element.

The control unit 180 is electrically connected to the touch module 120, the motion sensor 140, and the memory 160. The control unit 180 receives the motion data D1 from the motion sensor 140, and obtains the preset motion condition A1 from the memory 160, to determine whether the motion data D1 meets the preset motion condition A1 or not, and further determine whether the motion of the user conforms to the preset motion mode or not.

In an embodiment, the control unit 180 is a processor. When the motion data D1 meets the preset motion condition A1, the control unit 180 generates a virtual touch signal S2, to simulate a signal generated by the touch module 120 in a specific touch mode at a specific touch position. More specific illustration about details of the preset motion mode, the preset motion condition A1, and the virtual touch signal S2 is to be made in subsequent paragraphs corresponding to a control method.

Figure 2:
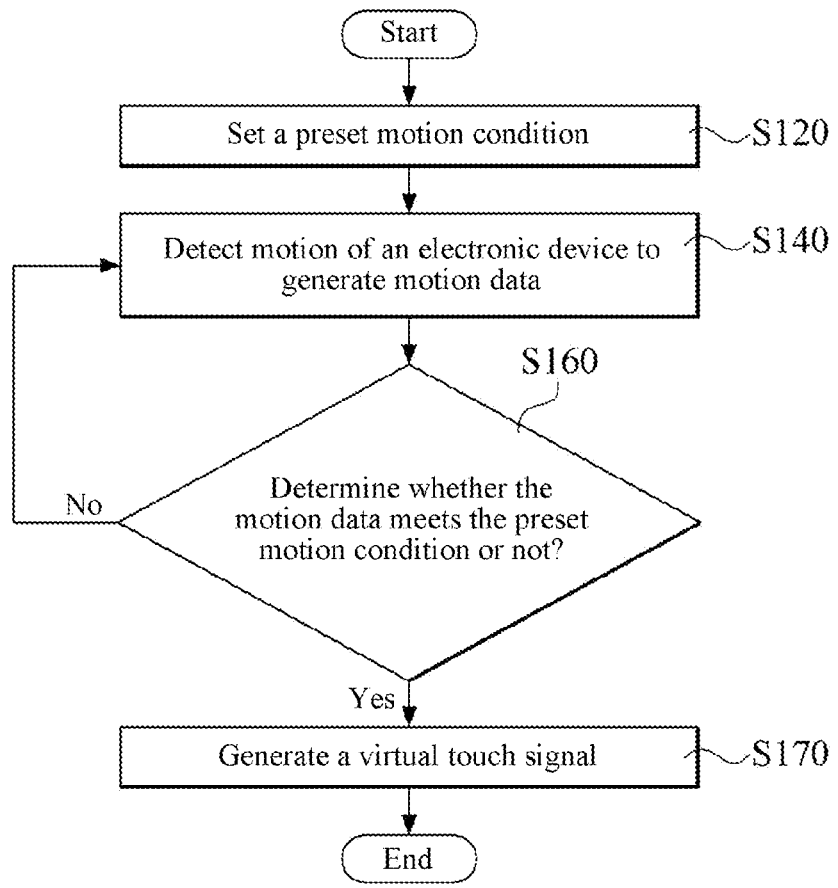
FIG. 2 is a schematic flowchart of a control method according to an embodiment of the disclosure.

FIG. 2 is a schematic flowchart of a control method according to an embodiment of the disclosure. The control method is applied to the electronic device 100 shown in FIG. 1. The control method includes the following steps.

At first, as shown in step S120, a preset motion condition A1 is provided. The preset motion condition A1 corresponds to a preset motion mode, and is used for determining whether motion of a user conforms to the preset motion mode or not.

In an embodiment, the preset motion mode corresponding to the preset motion condition A1 is a single-axis motion mode, such as a Z-axis motion mode. In another embodiment, the preset motion mode corresponding to the preset motion condition A1 is a Z-axis shaking mode. Because of the behavioral inertial motion, the Z-axis shaking mode presents a waveform of first going up and then down and finally returning to a fixed point, to form an output signal. Using the Z-axis shaking mode as an example, in an embodiment, the preset motion condition A1 includes an acceleration variation $\Delta y$ and a motion time t1, to determine whether motion of a user conforms to the preset motion mode or not.

Next, as shown in step S140, motion of the electronic device 100 is detected to generate motion data D1. In an embodiment, step S140 is performed by the motion sensor 140.

Next, as shown in step S160, whether the motion data D1 meets the preset motion condition A1 or not is determined. When the motion data D1 meets the preset motion condition A1, the process goes forward to step S170 for generating a virtual touch signal S2. When the motion data D1 does not meet the preset motion condition A1, the process goes back to step S140, for generating motion data D1 again. In an embodiment, step S160 and step S170 are performed by the control unit 180 and the touch module 120.

The virtual touch signal S2 includes touch position data. The touch position data is a preset touch coordinate or a preset touch range on a touch panel or a touch pad. In an embodiment, the preset touch range is a square range or a circular range. The virtual touch signal S2 also includes touch mode data, and the touch mode presented by the virtual touch signal S2 may be tapping, continuous tapping in a single region, sliding (simulating swiping or dragging), hard tapping (force touch), or the like. In an embodiment, the virtual touch signal S2 is set by the user, and stored in the memory 160. In an embodiment, the user directly makes a setting by using the touch module 120.

Figure 3:
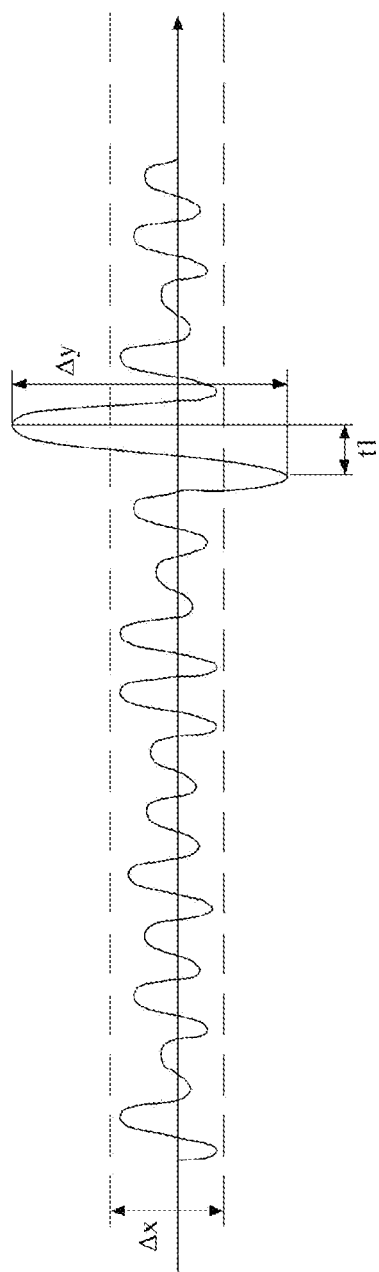
FIG. 3 is a waveform diagram showing a process of determining whether motion data meets a preset motion condition or not according to the disclosure.
Figure 4:
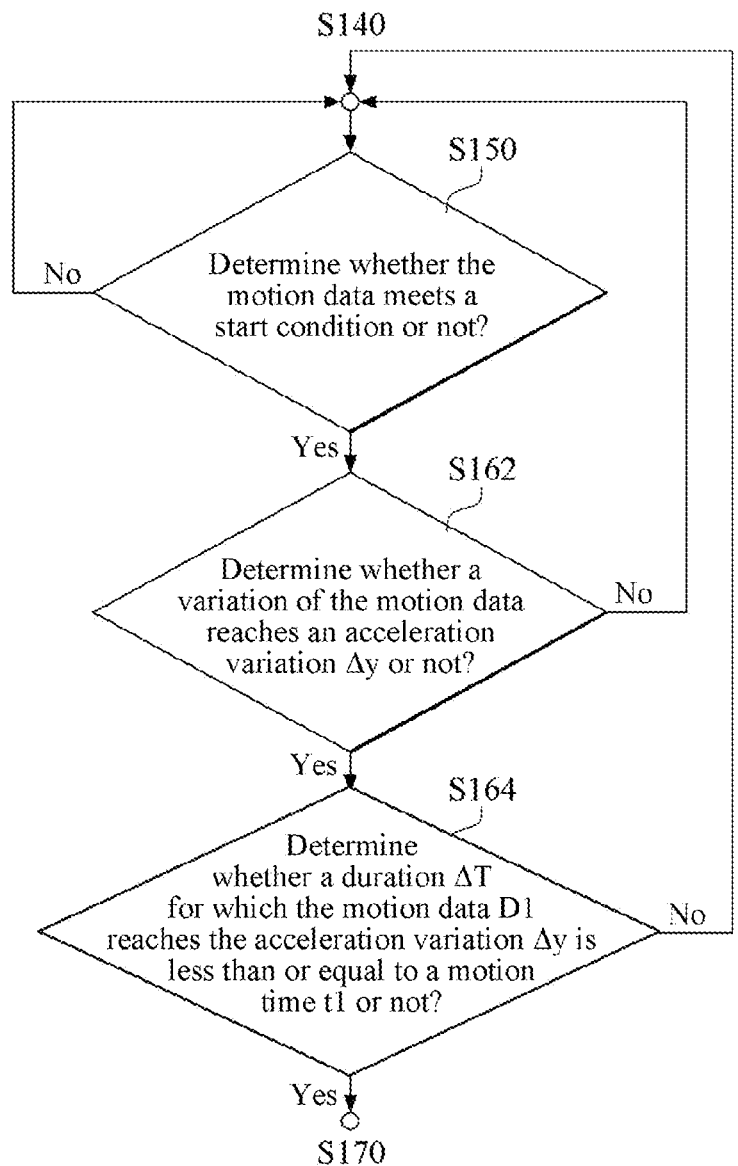
FIG. 4 is a flowchart showing a process of determining whether motion data meets a preset motion condition or not according to an embodiment of the disclosure.

Referring to both FIG. 3 and FIG. 4, FIG. 4 is a flowchart showing a process of determining whether the motion data D1 meets the preset motion condition A1 or not according to an embodiment of the disclosure, and FIG. 3 is a waveform diagram showing a process of determining whether the motion data D1 meets the preset motion condition D1 or not according to the disclosure. The motion data D1 in this embodiment is Z-axis acceleration data. The vertical axis of the waveform diagram represents values of a Z-axis acceleration.

The process is performed after step S140 in FIG. 2. At first, as shown in step S150, whether the motion data D1 meets a start condition or not is determined. When the motion data D1 does not meet the start condition, the process goes back to step S140 for detecting motion data D1 again. When the motion data D1 meets the start condition, the process goes forward to step S162, and starts to determine whether the motion data D1 meets the preset motion condition A1 or not. In an embodiment, the start condition is whether a variation of the motion data D1 exceeds a start variation $\Delta x$ or not, so as to distinguish a static state of the electronic device 100 from a motion state of the electronic device 100.

In step S162, whether the variation of the motion data D1 reaches the acceleration variation $\Delta y$ or not is determined at first in the process. The acceleration variation $\Delta y$ is greater than the start variation $\Delta x$. When the variation of the motion data D1 is less than the acceleration variation $\Delta y$, the process goes back to step S140 for detecting motion data D1 again. When the variation of the motion data D1 reaches the acceleration variation $\Delta y$, the process goes forward to step S164.

In step S164, whether a duration $\Delta T$ for which the motion data D1 reaches the acceleration variation $\Delta y$ is less than or equal to the motion time t1 is determined in the process. When the duration $\Delta T$ for which the motion data D1 reaches the acceleration variation $\Delta y$ is greater than the motion time t1, the process goes back to step S140 for detecting motion data D1 again. When the duration $\Delta T$ for which the motion data D1 reaches the acceleration variation $\Delta y$ is less than or equal to the motion time t1, it is determined that the motion data D1 meets the preset motion condition A1, and the process goes to step S170 for generating the virtual touch signal S2.

In an embodiment, to improve the determining accuracy, before step S140 of generating the motion data D1 is performed, a current value of the motion sensor 140 is set as an initial value, to reflect different usage scenarios of the user, such as lying and sitting while using.

In an embodiment, the preset motion condition A1 is set by the user, and stored in the memory 160. In an embodiment, the user directly makes a setting by using the touch module 120.

Figure 5:
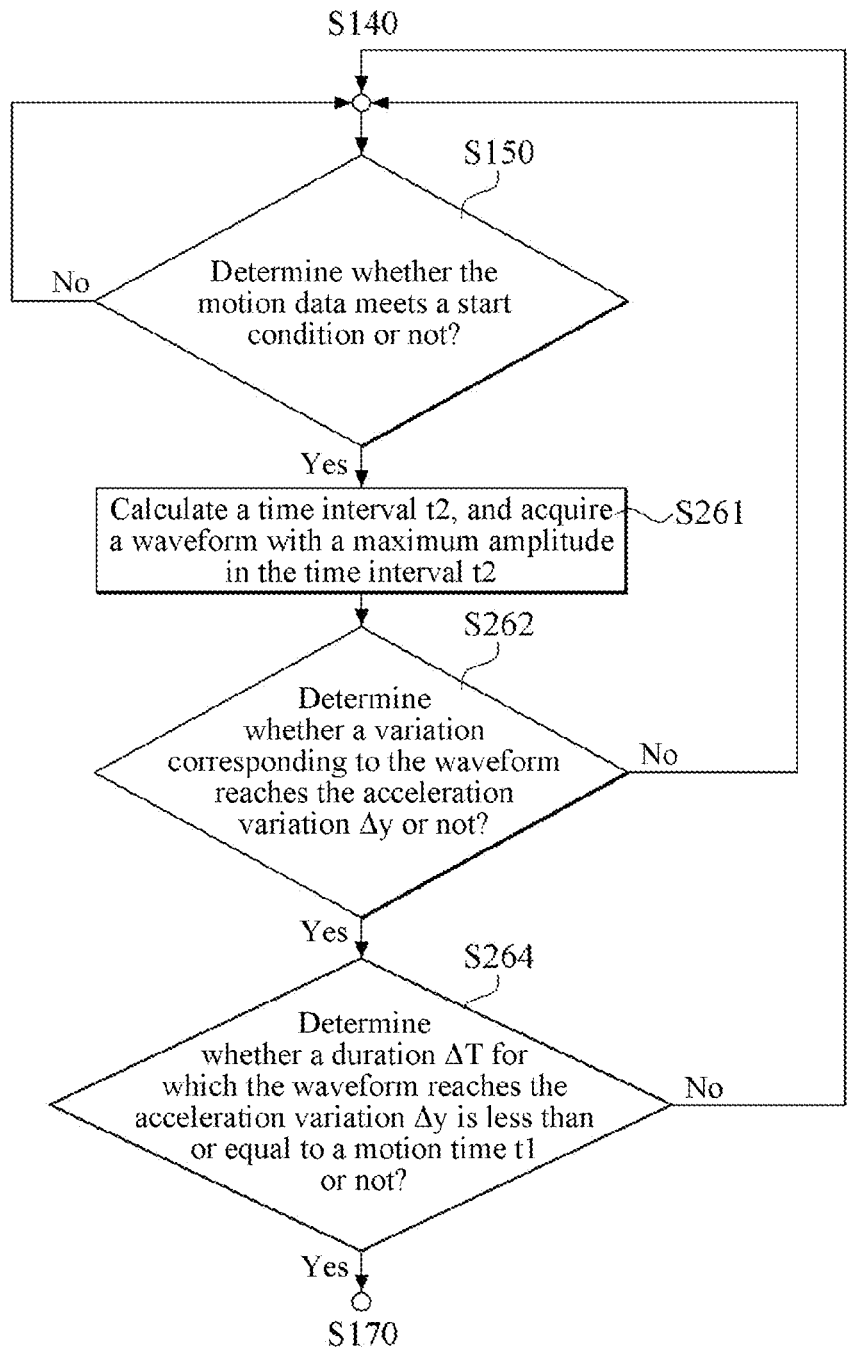
FIG. 5 is a flowchart showing a process of determining whether motion data meets a preset motion condition or not according to another embodiment of the disclosure.

FIG. 5 is a flowchart showing a process of determining whether the motion data D1 meets the preset motion condition A1 or not according to another embodiment of the disclosure. Steps in the figure the same as those in FIG. 4 are denoted by the same reference numerals. As shown in step S261, compared with the embodiment in FIG. 4, in this embodiment, when the motion data D1 meets a start condition and starts to determine whether the motion data D1 meets the preset motion condition A1 or not, a time interval t2 starts to be calculated at first, and a waveform with a maximum amplitude (which means a maximum acceleration change) in the time interval t2 is acquired as an input signal for determining, other secondary waveforms being ignored.

Next, in step S262, similar to step S162 in FIG. 4, whether a variation corresponding to the waveform reaches the acceleration variation $\Delta y$ or not is determined at first in the process. When the variation corresponding to the waveform is less than the acceleration variation $\Delta y$, the process goes back to step S140 for detecting motion data D1 again. When the variation corresponding to the waveform reaches the acceleration variation $\Delta y$, the process goes to step S264.

In step S264, whether a duration for which the waveform reaches the acceleration variation $\Delta y$ is less than or equal to the motion time t1 or not is determined in the process. When the duration for which the waveform reaches the acceleration variation $\Delta y$ is greater than the motion time t1, the process goes back to step S140 for detecting motion data D1 again. When the duration for which the waveform reaches the acceleration variation $\Delta y$ is less than or equal to the motion time t1, it is determined that the motion data D1 meets the preset motion condition A1, and the process goes to step S170 for generating the virtual touch signal S2.

Figure 6:
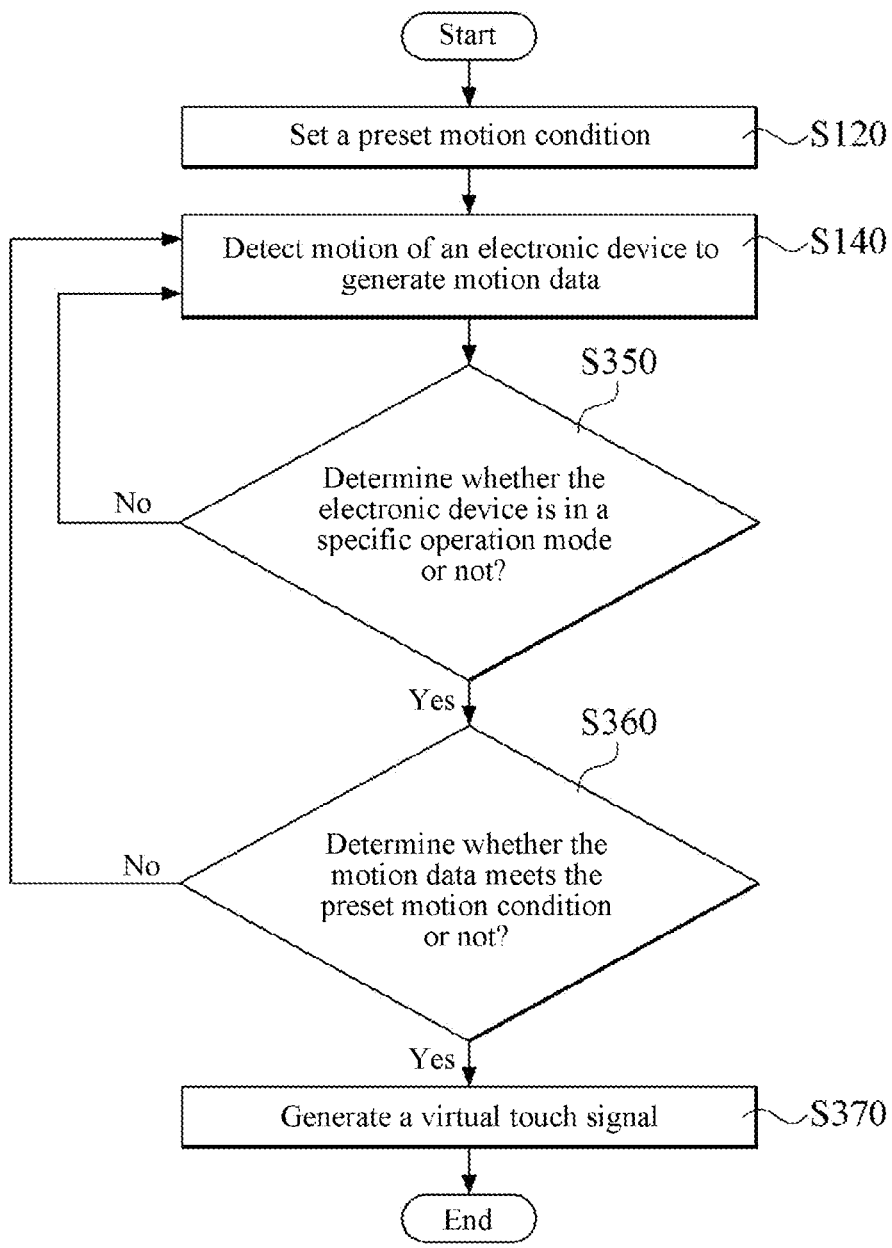
FIG. 6 is a flowchart showing a control method according to another embodiment of the disclosure.

FIG. 6 is a flowchart showing a control method according to another embodiment of the disclosure. Steps in the figure the same as those in FIG. 2 are denoted by the same reference numerals. To avoid a wrong action of the touch module 120 caused by the motion data D1 received by the motion sensor 140 in a usual operation of the electronic device 100, compared with the embodiment in FIG. 2, a step S350 is further included in this embodiment after step S140 of generating the motion data D1, to determine whether the electronic device 100 is in a specific operation mode or not, such as holding horizontally. When the electronic device is in the specific operation mode, the process goes forward to step S360 for determining whether the motion data D1 meets the preset motion condition A1 or not. When a determination result is yes, as shown in step S370, the virtual touch signal S2 is generated. When the electronic device is determined not in the specific operation mode, the process goes back to step S140 for generating motion data D1 again.

In the embodiment shown in FIG. 6, whether the electronic device 100 is in a specific operation mode or not is determined, and to determine whether to generate the virtual touch signal S2 or not. In another embodiment, to avoid a wrong action of the touch module 120 caused by the motion data D1 received by the motion sensor 140, the electronic device 100 is set to generating the virtual touch signal S2 after receiving a start signal. The start signal is a gesture signal received by the touch module 120 or a specific motion mode detected by the motion sensor 140.

According to the electronic device and the control method disclosed herein, when users perform input operations by the touch module 120, the motion sensor user simultaneously generate the virtual touch signal that simulate touch inputting, thus to replace a touch operation and improves the control efficiency.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure is subject to the appended claims.

What is claimed is:

1. An electronic device, comprising:
a touch module, configured to generate a touch signal;
a motion sensor, configured to detect motion of the electronic device to generate motion data;
a memory, storing a preset motion condition; and
a control unit, electrically connected to the touch module, the motion sensor, and the memory, and configured to:
receive the motion data; and
when the motion data meets a start condition, determine whether the motion data meets the preset motion condition or not, and generate a virtual touch signal when the motion data meets the preset motion condition;
wherein the preset motion condition is whether a value change of the motion data reaches an acceleration threshold and a duration for which the motion data reaches the acceleration threshold is less than or equal to a motion time;
wherein the start condition is whether a value change of the motion data exceeds a start threshold;
wherein the acceleration threshold is greater than the start threshold;
wherein the virtual touch signal is used to simulate the touch signal;
wherein the electronic device is set to generating the virtual touch signal after receiving a start signal; and
wherein the start signal is a gesture signal received by the touch module or a motion mode detected by the motion sensor.

2. The electronic device according to claim 1, wherein the motion sensor is an accelerometer or a gyroscope.

3. The electronic device according to claim 1, wherein the preset motion condition corresponds to a single-axis motion mode.

4. The electronic device according to claim 3, wherein the single-axis motion mode is a shaking mode.

5. The electronic device according to claim 1, wherein the motion data is single-axis motion data.

6. The electronic device according to claim 1, wherein the virtual touch signal comprises touch position data and touch mode data.

7. A control method, applied to an electronic device, comprising:
setting a preset motion condition;
detecting motion of the electronic device to generate motion data; and
when the motion data meets a start condition, determining whether the motion data meets the preset motion condition or not, and generating a virtual touch signal when the motion data meets the preset motion condition;
wherein the preset motion condition is whether a value change of the motion data reaches an acceleration threshold and a duration for which the motion data reaches the acceleration threshold is less than or equal to a motion time;
wherein the start condition is whether a value change of the motion data exceeds a start threshold;
wherein the acceleration threshold is greater than the start threshold;
wherein the virtual touch signal is used to simulate the touch signal;
wherein the electronic device is set to generating the virtual touch signal after receiving a start signal; and
wherein the start signal is a gesture signal received by the touch module or a motion mode detected by the motion sensor.

8. An electronic device, comprising:
a touch module, configured to generate a touch signal;
a motion sensor, configured to detect motion of the electronic device to generate motion data;
a memory, storing a preset motion condition; and
a control unit, electrically connected to the touch module, the motion sensor, and the memory, and configured to:
receive the motion data; and
when the motion data meets a start condition, determine whether the motion data meets the preset motion condition or not, and generate a virtual touch signal when the motion data meets the preset motion condition;
wherein the preset motion condition is whether a value change of the motion data reaches an acceleration threshold and a duration corresponding to the value change is less than or equal to a motion time;
wherein the start condition is whether a value change of the motion data exceeds a start threshold;
wherein the acceleration threshold is greater than the start threshold;
wherein the virtual touch signal is used to simulate the touch signal;
wherein the motion data is a single-axis acceleration data.

* * * * *